United States Patent [19]

Metzger et al.

[11] Patent Number: 4,534,526

[45] Date of Patent: Aug. 13, 1985

[54] CABIN NOISE SUPPRESSION IN PROPELLER DRIVEN AIRCRAFT

[75] Inventors: Frederick B. Metzger, Simsbury; Bernard Magliozzi, West Suffield, both of Conn.

[73] Assignee: United Technologies Corporation, Hartford, Conn.

[21] Appl. No.: 453,199

[22] Filed: Dec. 27, 1982

[51] Int. Cl.³ .......................... B64C 1/26; B64C 1/40; B64C 3/00

[52] U.S. Cl. .................. 244/38; 244/117 R; 244/1 N; 267/141; 181/208

[58] Field of Search .................. 244/1 N, 117 R, 119, 244/129.4, 38; 267/141, 153; 188/378, 379; 181/207, 208; 89/37.5 R, 37.5 C

[56] References Cited

U.S. PATENT DOCUMENTS

| | | | |
|---|---|---|---|
| 2,153,099 | 4/1939 | Saives | 244/123 |
| 2,581,625 | 1/1952 | Brady | 244/119 |
| 2,929,586 | 3/1960 | Hurd, Jr. et al. | 181/207 |
| 3,472,472 | 10/1969 | Maestrello | 244/117 R |
| 3,779,338 | 12/1973 | Hayden et al. | 181/33 C |

Primary Examiner—Trygve M. Blix
Assistant Examiner—Rodney Corl
Attorney, Agent, or Firm—John Swiatocha

[57] ABSTRACT

The fuselage (cabin) (15) of a propeller (45) driven aircraft (10) is isolated from vibration associated with the wake (46) of the propeller by vibration isolators (50, 55 and 110) in the wing and tail surfaces of the aircraft.

7 Claims, 5 Drawing Figures

CABIN NOISE SUPPRESSION IN PROPELLER DRIVEN AIRCRAFT

TECHNICAL FIELD

This invention relates generally to propeller driven aircraft and more particularly to the suppression in such aircraft of aerodynamic noise associated with the wakes of the aircraft propellers.

BACKGROUND ART

It has long been known that interior noise in propeller driven aircraft is due at least in part to the impingement of airborne noise from the aircraft propellers on that portion of the fuselage in the area of the propeller plane(s) of rotation. In an effort to reduce such interior noise, modern, propeller driven aircraft have been designed with greater clearances between the propeller tips and the surface of the fuselage. However, increasing such clearances has met with only limited success. It has been discovered that a probable, substantial source of interior noise is the propeller wake, such noise from the wake causing vibration in the wing and tail surfaces, and excitation of the fuselage by transmission thereto of the wing and tail surface vibration through the locations of connection of these components with the fuselage.

DISCLOSURE OF INVENTION

Accordingly, among the objects of the present invention is the suppression in propeller driven aircraft of noise associated with impingement of the propeller wake(s) on the aircraft wing and tail surfaces.

In accordance with the present invention, the wing and tail surfaces of the aircraft are provided with vibration isolators which reduce cabin noise associated with propeller wake impingement on wing and tail surfaces. In one embodiment, the wing vibration isolators each include first and second generally parallel portions disposed at the wing leading edge, on opposite sides of the outer boundaries of each wake and a third portion connecting the first and second portions and oriented generally perpendicular thereto such that the portions of the wing impacted by the wake are acoustically isolated from the fuselage by the isolators. In another embodiment, the first and second vibration isolator portions are disposed on opposite sides of the entire wake and extend substantially across the entire chord of the wing. The wing surface is connected to an interior spar by vibration mounts which impede the transmission of wake induced vibration to the fuselage from that portion of the wing surface between the first and second vibration isolator portions. The tail surfaces may also be provided with vibration isolators to minimize the transmission of wake induced vibration to the fuselage.

BEST MODE FOR CARRYING OUT THE INVENTION AND INDUSTRIAL APPLICABILITY

Figure 1:
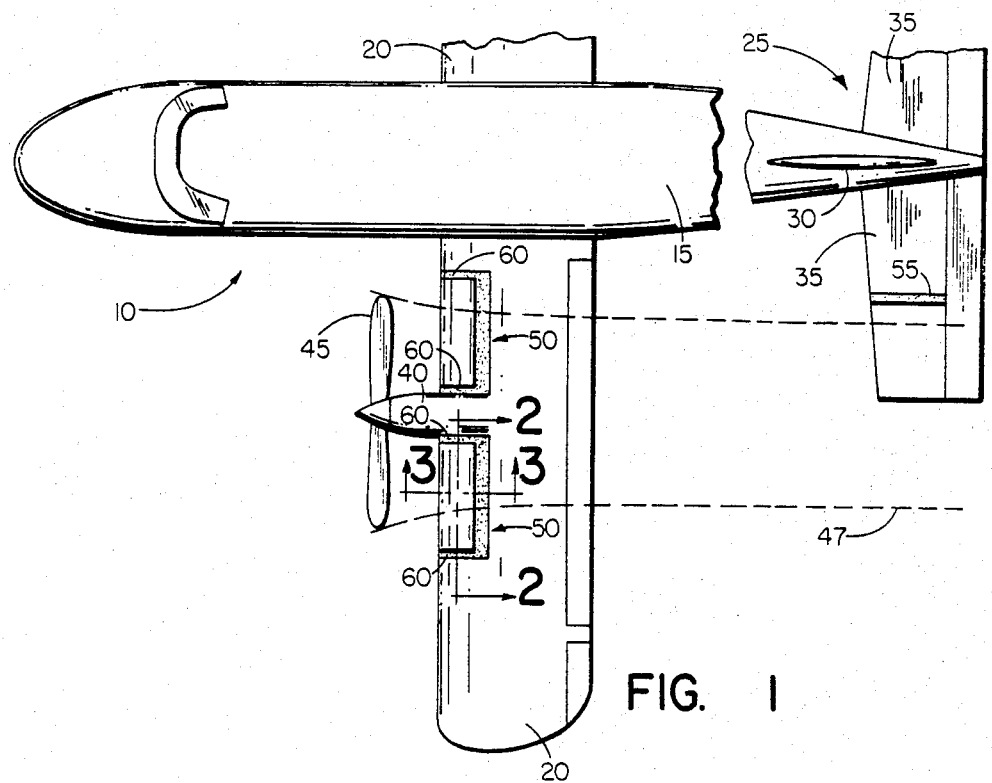
FIG. 1 is a top plan view of an aircraft employing the present invention.
Figure 3:
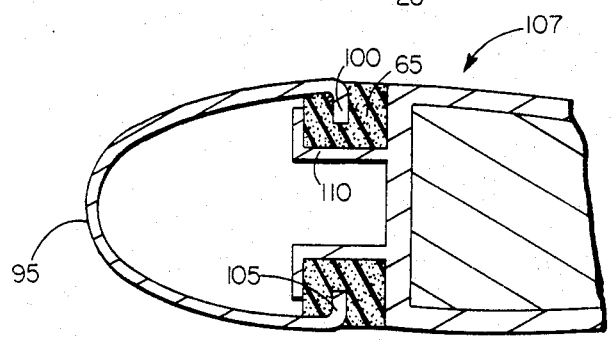
FIG. 3 is a sectional view taken in the direction of line 3—3 of FIG. 1.
Figure 2:
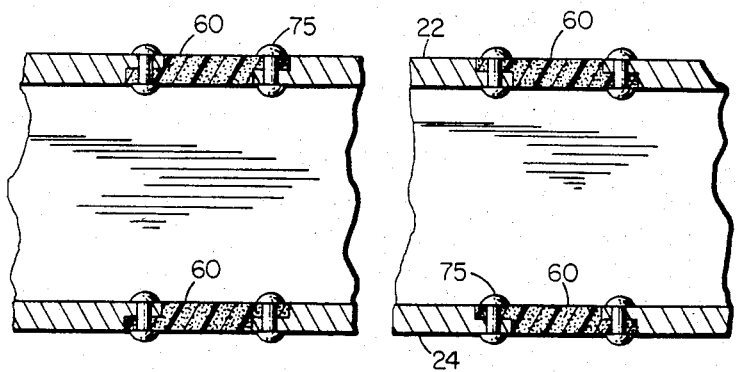
FIG. 2 is a sectional view taken in the direction of line 2—2 of FIG. 1.

Referring to the drawing and in particular to FIGS. 1-3 thereof, there is shown a propeller driven aircraft 10 including a fuselage 15, wings 20 including upper and lower skins 22 and 24, respectively (FIG. 3), and tail 25 comprising a vertical stabilizer 30 and a horizontal stabilizer 35. Each of the wings supports an engine 40 secured thereto in any manner well known in the art, engine 40 driving a propeller 45 which propels the aircraft. The propellers each create a wake 46 (defined by outer boundary 47) which impinges on the wings and horizontal stabilizer 35.

As set forth hereinabove, it has been determined that in addition to airborne noise from the propeller impinging directly on the walls of fuselage 15, noise within the interior of the fuselage (in the cabin) includes to a substantial extent, noise associated with the wake of the propeller which impinges on the wings and horizontal stabilizer of the tail. The outer surface of the fuselage is excited by vibration in the wing and tail surfaces induced by the propeller wake.

In accordance with the present invention, at least substantial portions of such noise resulting from the propeller wake are isolated within the wings and tail by vibration isolators provided in both the upper and lower surfaces thereof, the wing vibration isolators being shown at 50 and the tail isolators being shown at 55. As shown in the drawings, each wing vibration isolator 50 is disposed at the wing's leading edge and comprises a generally U-shaped member formed from such materials as elastomers or other resilient means tuned to absorb vibration at or above the blade passage frequency (number of blades×frequency of rotation/60). Thus, it will be seen that each of the upper and lower skin portions 22 and 24 of wing 20 are provided with a pair of vibration isolators, each including first and second spaced elongate portions 60 parallel to the boundary 47 of the propeller wake 46 and connected by a third portion 65 generally normal thereto. The first and second portions may be fixed to upper and lower wing skin surfaces 22 and 24 by any known means. By way of example, as shown in FIG. 2, the skin portions and first and second vibration isolator portions 60 may be rabbeted and joined by rivets 75 or pins or other equivalent fasteners. Alternatively, the vibration isolator members may be adhesively bonded to the wing skins by any suitable adhesive as will be determined by the mechanical loading of the wing, the noise frequencies of concern and the materials employed in the vibration isolators and wing skin.

FIG. 3, illustrates the arrangement for connecting third portion 65 to the wing. As illustrated in FIG. 3, leading edge portion 95 of wing 20 is continuous, including opposite flange portions 100 each having a free edge portion 105 received within a mating groove in third vibration isolator portion 65. The interior of the wing at the front of trailing portion 107 thereof is provided with a flange portion 110 which defines a channel within which third portion 65 is received. It will be seen that flanges 100 and 110 interlock with isolator portion 65 whereby a firm, substantially fail-safe attachment of member 60 to the wing is maintained.

As perhaps best seen in FIG. 3, vibration isolator 50, being located at the wing's leading edge, is situated generally at the thickest portion of the wing. Accordingly, it will be appreciated that the vibration isolator surrounds that portion of the wing on which the propeller wake impinges. Accordingly, any vibration associated with the wake will encounter vibration isolator 50 as it is transmitted through the wing skins, isolator 50 isolating the fuselage (cabin) from such vibration and attenuating substantial portions of such vibration within the wing. Referring again to FIG. 1, isolator 55 in horizontal stabilizer 35 may include a single member of the same material as isolator 50. Likewise, isolator 55 may be fixed to the horizontal stabilizer by any of the methods described hereinabove with respect to isolator portion 60, such as the arrangement shown in FIG. 2. Like isolator 50, isolator 55 blocks the transmission of vibration associated with the propeller wake through the stabilizer to the aircraft fuselage thereby substantially reducing cabin noise associated with the wake.

Figure 4:
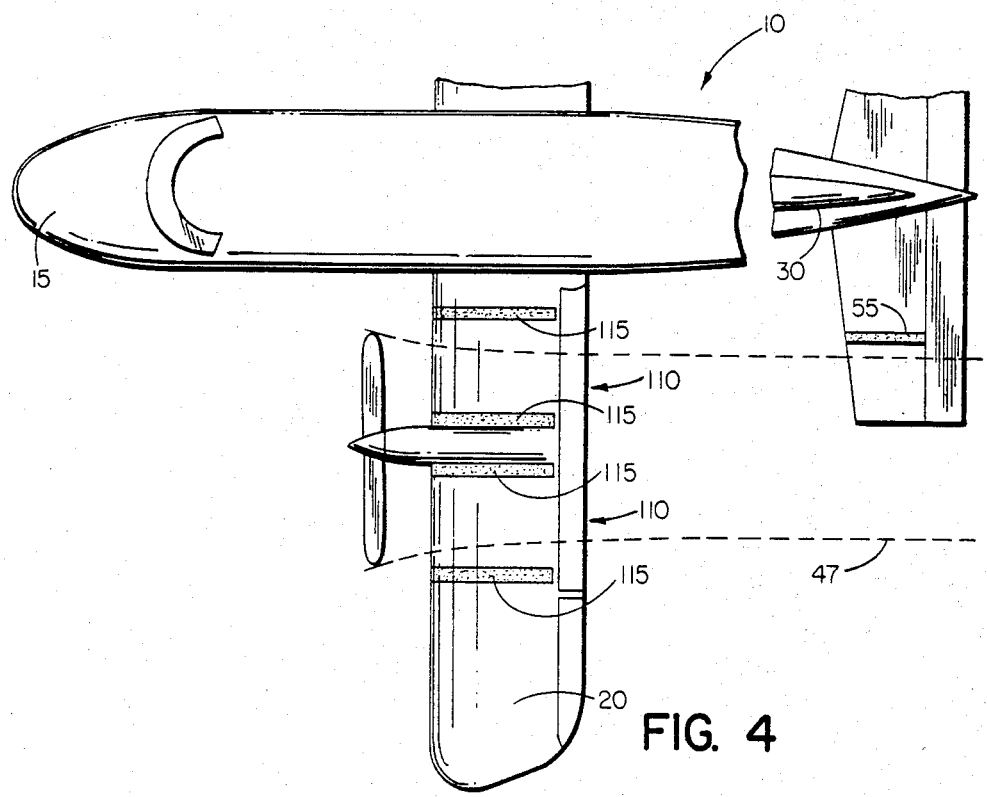
FIG. 4 is a top plan view of an aircraft, an alternate embodiment of the present invention.
Figure 5:
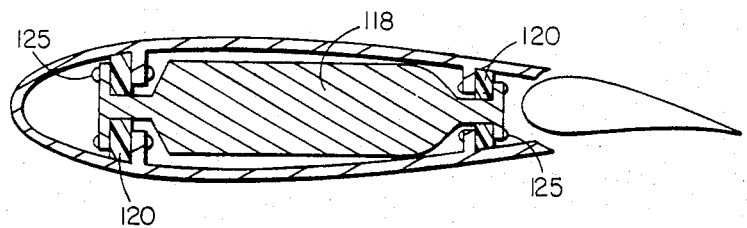
FIG. 5 is a sectional view taken in the direction of line 5—5 of FIG. 4.

An alternate embodiment of isolator 50 is shown in FIGS. 4 and 5 wherein vibration isolators 110 are employed in the upper and lower skin portions of the aircraft wing. Each isolator 110 comprises a pair of members 115 extending generally from the wing leading edge to the juncture of the wing and associated wing flap. Members 115 may be formed from any of the materials set forth hereinabove and may be fixed to the wing skin by any of the methods discussed hereinabove with respect to isolator portions 60 such as the arrangement depicted in FIG. 2. It will be understood that members 115 being interposed between the wing surface and the fuselage, will absorb substantial amounts of wake induced vibration through the wing skin. However, it will be appreciated that without further vibration isolation means, wake excitations could be transmitted to the cabin through the wing skin and into the wing spar which provides a structural connection of the wings with the fuselage. Accordingly, as illustrated in FIG. 5, the wing skins or surfaces are connected to the spar 118 by vibration suppressing mounts 120 connected to the spar and skin by any suitable known technique such as by rivets or similar fasteners 125 attaching the flanges provided in the joined skin, mount and spar surfaces, and may be formed from any of the materials discussed hereinabove. Thus, it will be seen that mounts 120 will isolate the spar from the wing skin to minimize the transmission of wake induced vibration from the skin through the spar and into the aircraft cabin.

While two particular embodiments of the invention herein have been shown and described, it will be appreciated that alternate equivalent embodiments will, from this disclosure, suggest themselves to those skilled in the art and it is intended by the following claims to cover such modifications as fall within the true spirit and scope of this invention.

Having thus described with invention, what is claimed is:

1. In an aircraft including a fuselage and a wing and powered by one or more engine driven propellers each establishing a wake downstream thereof, said wake impinging on said aircraft wing, the improvement characterized by:

said wing being provided at the outer surface thereof with vibration isolating means disposed between said fuselage and the location of impingement of said propeller wake with said wing, said vibration isolating means including first and second elongate portions extending generally parallel to the boundary of said wake and a third portion connecting said first and second portions and oriented generally perpendicular thereto, thereby isolating said location from said fuselage for minimizing the propagation of vibration from said wake to said fuselage through said wing.

2. The improvement of claim 1 characterized by said wing including at least one structural spar extending longitundinally therewithin, said wing surface being connected to said spar by vibration suppressing mounts disposed therebetween.

3. The improvement of claim 1 characterized by said wing including a leading outer surface and a trailing portion each of said leading outer surface and trailing portions including opposed flange portions interlocked with said third vibration isolating portion.

4. The improvement of claim 1 characterized by one of said flange portions defining an elongate channel within which said third portion is received, said third portion being provided with a slot within which the free edge portion of the other of said flange portions is received.

5. The improvement of claim 1 characterized by said vibration isolating means comprising an elastomer.

6. The improvement of claim 1 characterized by said aircraft including a tail portion, the surface of said tail portion including across substantially the entire chord thereof, vibration isolating means disposed between said propeller wake and said fuselage for minimizing the propagation of vibration induced by said wake to said fuselage through said tail portion.

7. The improvement of claims 1 or 6 characterized by said vibration isolating means being absorbent to noise of frequencies at and above the blade passage frequency of said propeller.

* * * * *